(12) United States Patent
Fang

(10) Patent No.: US 6,398,996 B1
(45) Date of Patent: Jun. 4, 2002

(54) FOOTWEAR SOLE WITH AIR CHAMBERS DEFINED THEREIN AND A METHOD FOR MAKING THE SAME

(75) Inventor: Wen-Tsung Fang, Taichung (TW)

(73) Assignee: Jiunn Long Plastic Co., Ltd., Taichung (TW)

( * ) Notice: Subject to any disclaimer, the term of this patent is extended or adjusted under 35 U.S.C. 154(b) by 0 days.

(21) Appl. No.: 09/695,826

(22) Filed: Oct. 26, 2000

(51) Int. Cl.[7] ............................................... B29C 44/02
(52) U.S. Cl. ...................................... 264/51; 264/328.7
(58) Field of Search ............................. 264/51, 53, 54, 264/328.7

(56) References Cited

U.S. PATENT DOCUMENTS

| | | | | |
|---|---|---|---|---|
| 3,474,496 A | * | 10/1969 | Klee ........................... | 264/328.7 |
| 3,608,004 A | * | 9/1971 | Borisuck et al. ............ | 264/328.7 |
| 3,652,757 A | * | 3/1972 | Wessel et al. .............. | 264/328.7 |
| 3,684,420 A | * | 8/1972 | Barker ........................ | 264/51 |
| 3,897,190 A | * | 7/1975 | Binzburg et al. ........... | 264/54 |
| 4,296,053 A | * | 10/1981 | Doerer et al. ............... | 264/54 |
| 5,091,125 A | * | 2/1992 | Harada et al. .............. | 264/51 |
| 5,476,620 A | * | 12/1995 | Lung ........................... | 264/51 |
| 5,560,877 A | * | 10/1996 | Yung et al. .................. | 264/51 |
| 5,667,738 A | * | 9/1997 | Krajcir ........................ | 264/45.5 |
| 5,837,174 A | * | 11/1998 | Bisconti ....................... | 264/54 |
| 5,843,352 A | * | 12/1998 | Chi .............................. | 264/51 |
| 5,868,981 A | * | 2/1999 | Bisconti ....................... | 264/51 |
| 5,942,172 A | * | 8/1999 | Huang Liu ................... | 264/51 |
| 5,972,257 A | * | 10/1999 | Liu .............................. | 264/51 |
| 6,238,602 B1 | * | 5/2001 | Liu .............................. | 264/51 |

* cited by examiner

*Primary Examiner*—Allan R. Kuhns
(74) *Attorney, Agent, or Firm*—Charles E. Baxley

(57) ABSTRACT

A footwear sole includes a single foamable material that has air chambers defined in the footwear sole. The sole is formed in a cavity of a mold and the air chambers are defined by removing movable members in the cavity when the foaming process comes to a final stage so that a layer of the foam material is peeled with the movable members to define air chambers in the sole.

2 Claims, 6 Drawing Sheets

FOOTWEAR SOLE WITH AIR CHAMBERS DEFINED THEREIN AND A METHOD FOR MAKING THE SAME

FIELD OF THE INVENTION

The present invention relates to a footwear sole that has air chambers defined therein by moving movable members in the cavity of the mold during foaming process.

BACKGROUND OF THE INVENTION

A conventional footwear sole 10 with a cushion member 13 received therein is shown in FIG. 1 and the cushion member 13 is received in a heel portion of the sole 10. The cushion member 13 is a bladder which is made independently from the process of making the sole 10 and the sole 10 has to be provided with a recess so that the cushion member 13 is received in the recess. Air or oil is filled in the cushion member 13 so that it is deformable and absorbs kinetic energy to provide a comfort during jogging or walking. For the manufacturers, the combination of the cushion member 13 and the sole 10 requires too many processes and different materials and related machinery.

The present invention intends to provide a method for making a footwear sole that is made of single material and has air chambers defined in the sole during foaming processes.

SUMMARY OF THE INVENTION

In accordance with one aspect of the present invention, there is provided a footwear sole having air chambers defined therein wherein the sole is made from a single foamable material and the air chambers are defined during foaming process in a mold.

The primary object of the present invention is to provide a single-material footwear sole that has air chambers defined therein.

Another object of the present invention is to provide a method for making the sole having air chambers defined therein during foaming process in a mold.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
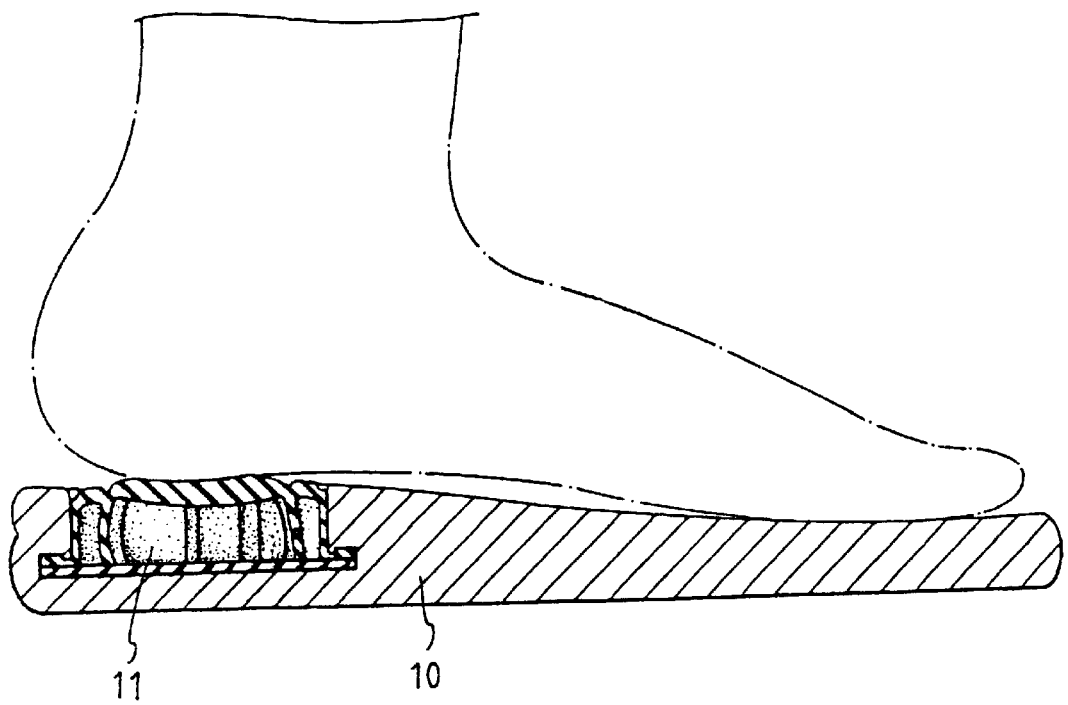
FIG. 1 is a cross sectional view to show a conventional footwear sole with a cushion member received therein.
Figure 2:
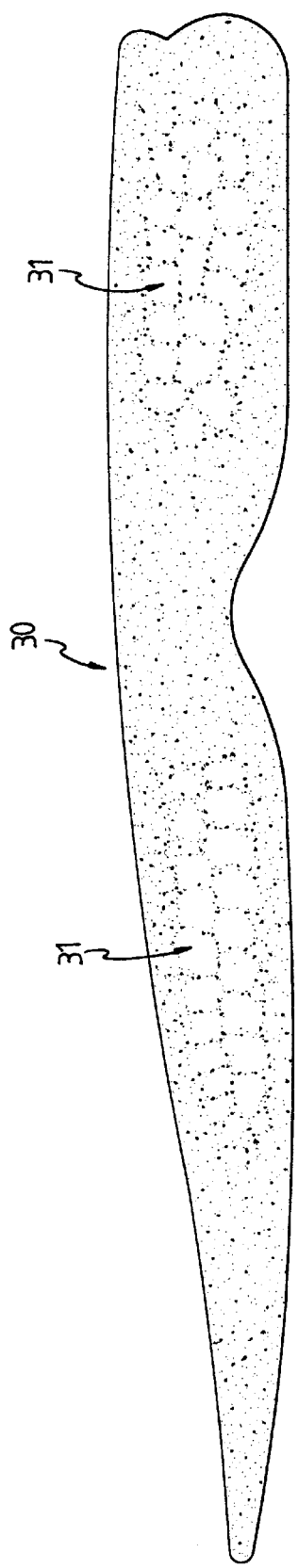
FIG. 2 is an illustrative view to show a footwear sole of the present invention wherein air chambers are defined in the footwear sole.

Referring to FIG. 2, the footwear sole 30 of the present invention is made of a single foamable material and a plurality of air chambers 31 are defined in two positions where the ball portion and the heel portion of a wearer's foot are located. The air chambers 31 provide cushion feature, and the sole 30 is made from single material during one foaming step effectively reduce the manufacturing cost.

Figure 3:
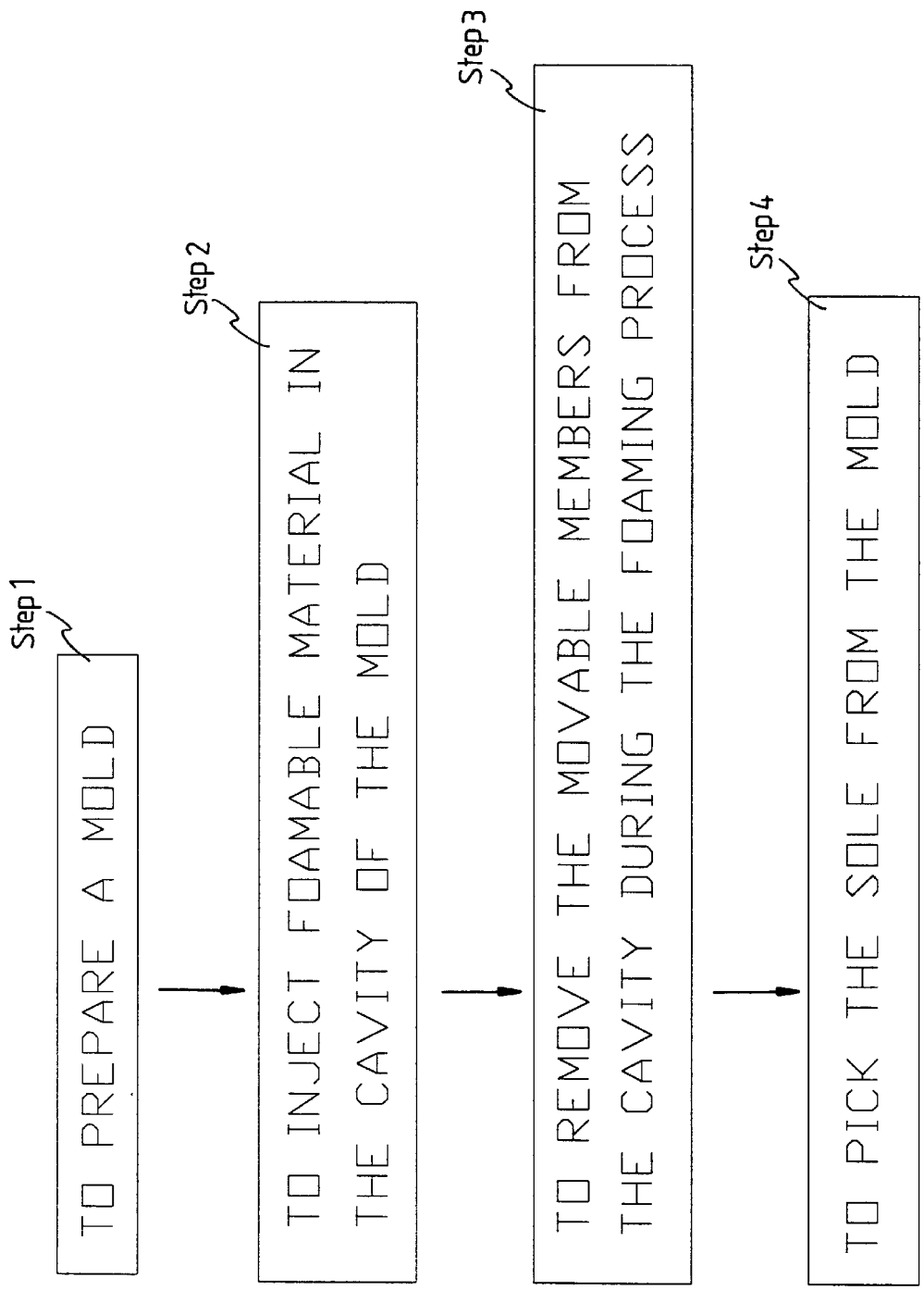
FIG. 3 is a flow chart to show the steps for making the footwear sole as shown in FIG. 2.
Figure 4:
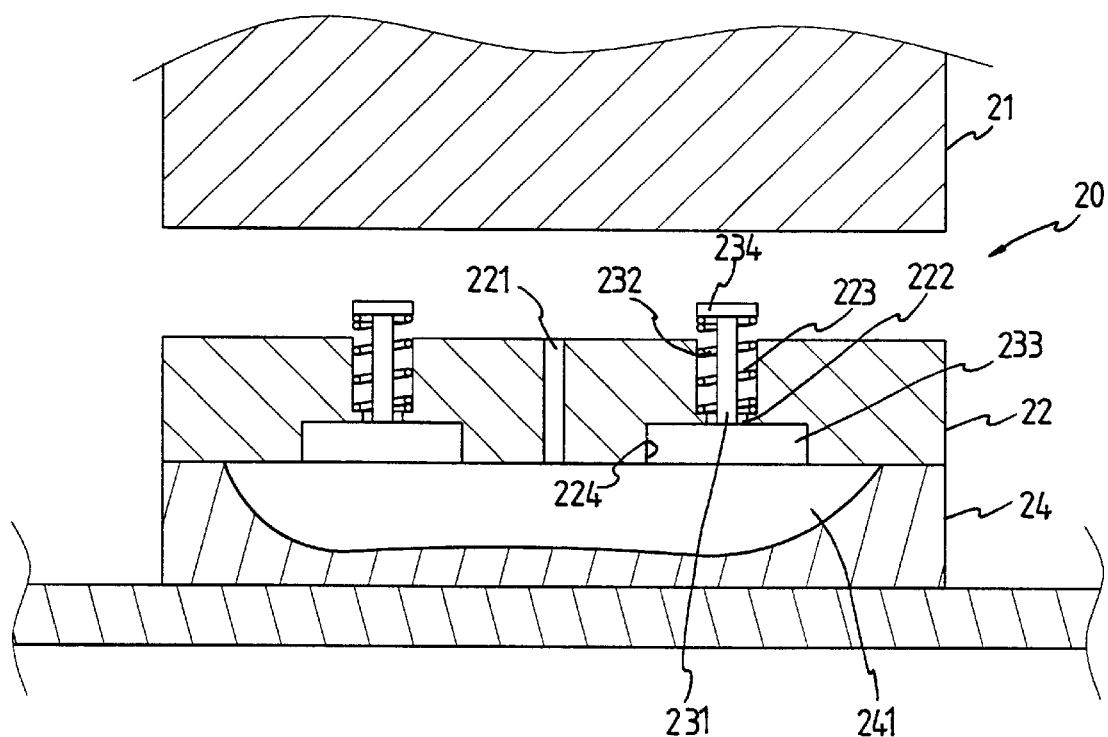
FIG. 4 is a cross sectional view to show a device that is used to make the footwear sole of the present invention.
Figure 5:
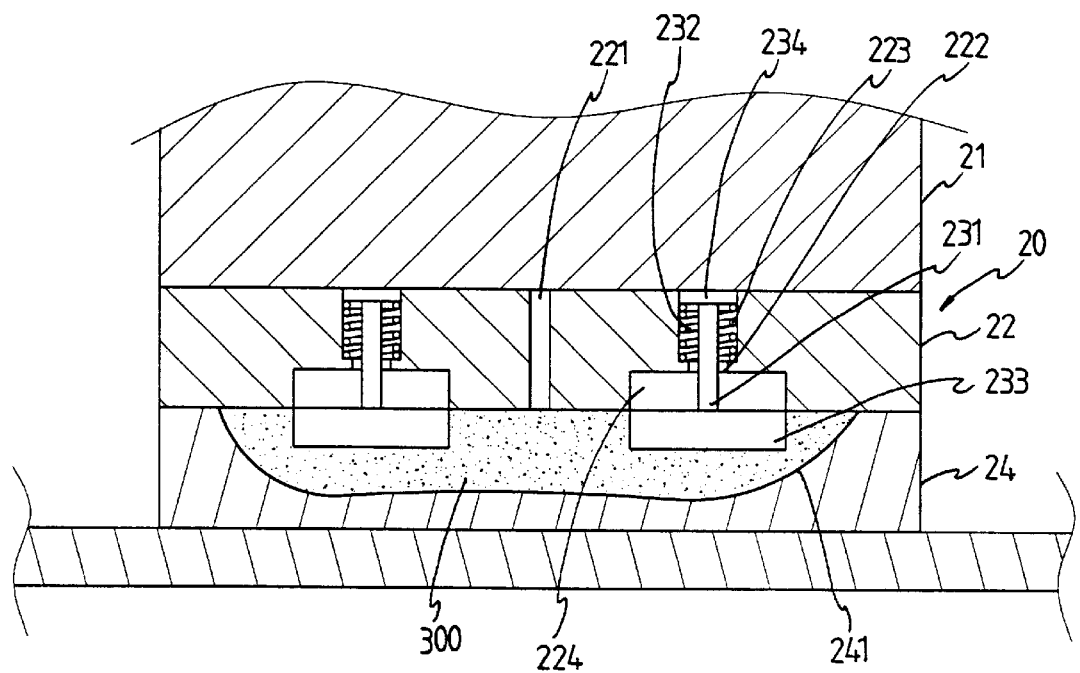
FIG. 5 shows foamable material is injected into a cavity of the mold and movable members are located in the cavity.
Figure 6:
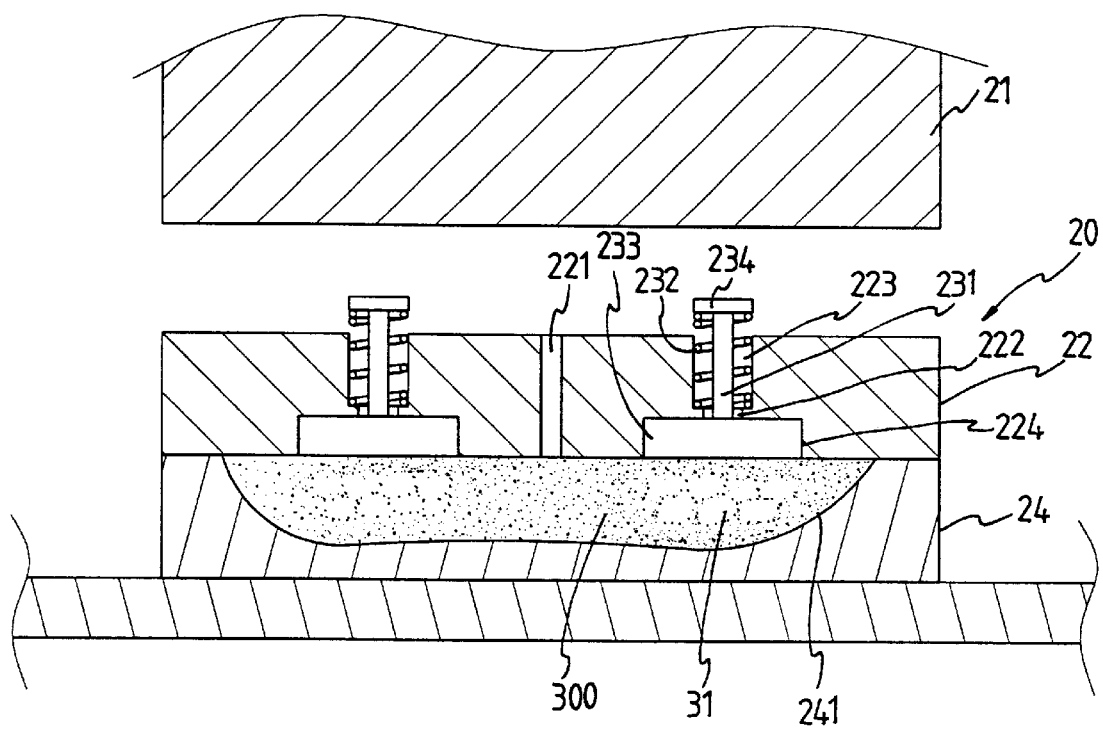
FIG. 6 shows that the movable members are removed from the cavity and air chambers are defined in the positions where the movable members were located.

Referring to FIGS. 3 to 5, the method for making the footwear sole 30 of the present invention comprises the following steps:

step 1: to prepare a mold 20 as shown in FIG. 4;

The mold 20 includes an upper mold 22 and a lower mold 24 in which a cavity 241 is defined. The upper mold 22 has a passage 221 for the foamable material entering and two holes 232 defined therein. Two recesses 224 are defined in an underside of the upper mold 22 and respectively communicate with the two holes 223. Two movable members 233 are respectively received in the two recesses 224 and each movable member 233 has a rod 231 extends therefrom and passes through the hole 223 corresponding thereto. Each rod 231 has a enlarged head 234 which is located above a top surface of the upper mold 22. A flange 222 extends radially inward from an inner periphery of each of the holes 223 near the recess 224 so as to allow a spring 232 biased between the flange 222 and the head 234 of each of the rods 231. A top board 21 is located above the upper mold 22 and moves toward the upper mold 22 to push the rods 231 and the movable members 233 are inserted into the cavity 241.

step 2: to inject foamable material 300 in the cavity 241 as shown in FIG. 5; The foamable material 300 is injected into the cavity 241 via the passage 221 in the upper mold 22 and encloses the movable members 233. The foamable material 300 is then processing the foaming process to fill the entire space of the cavity 241.

step 3: to remove the movable members 233 from the cavity 241 during the foaming process of the foamable material 300;

Referring to FIG. 6, when the foaming process comes to a final stage, the top board 21 is removed from the top mold 22 and the rods 231 are moved upward by the springs 232. Because the foaming process is in a final stage so that the space left by the movable members 233 will not be occupied or filled by the foamable material 300. The movable Members 233 will bring a layer of the foamable material therewith because the viscosity of the material and before the foamable material 300 is completely foamed and set, only few foamable material 300 is attracted by the moving of the movable members 233 so as to form several air chambers 31.

step 4: to pick the sole 30 from the mold 20.

It is to be noted that the sole 30 is made by only one foamable material 300 and the air chambers 31 are defined during the foaming process in the mold 20. This effectively reduces the manufacturing cost and the positions of the air chambers 31 can be pre-determined by setting the movable members 233. The speed of the moving of the movable members 233 and the timing of the moving of the movable members 233 will change the way that the air chambers 31 are defined.

While we have shown and described various embodiments in accordance with the present invention, it should be clear to those skilled in the art that further embodiments may be made without departing from the scope and spirit of the present invention.

What is claimed is:

1. A method for making a footwear sole, comprising the following steps:

step 1: preparing a mold with a cavity and at least one movable member being inserted into said cavity;

step 2: injecting foamable material in said cavity;

step 3: removing said at least one movable member from said cavity during a foaming process of said foamable material, said at least one movable member being moved when said foaming process comes to a final stage so that air chambers are defined in a position where said at least one movable member was previously located, and;

step 4: picking said sole from said mold.

2. The method as claimed in claim 1 wherein said at least one movable member pulls a layer of said foamable material therewith in step 3.

* * * * *